United States Patent
Fodor et al.

(10) Patent No.: US 9,736,817 B2
(45) Date of Patent: Aug. 15, 2017

(54) METHOD AND ARRANGEMENT FOR D2D DISCOVERY

(71) Applicant: Telefonaktiebolaget L M Ericsson (publ), Stockholm (SE)

(72) Inventors: Gabor Fodor, Hässelby (SE); Zhe Li, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/408,200

(22) PCT Filed: Oct. 24, 2012

(86) PCT No.: PCT/SE2012/051144
§ 371 (c)(1),
(2) Date: Dec. 15, 2014

(87) PCT Pub. No.: WO2013/191609
PCT Pub. Date: Dec. 27, 2013

(65) Prior Publication Data
US 2015/0131571 A1 May 14, 2015

Related U.S. Application Data

(60) Provisional application No. 61/661,362, filed on Jun. 19, 2012.

(51) Int. Cl.
*H04W 92/00* (2009.01)
*H04B 7/208* (2006.01)
(Continued)

(52) U.S. Cl.
CPC .......... *H04W 72/04* (2013.01); *H04W 4/005* (2013.01); *H04W 8/005* (2013.01)

(58) Field of Classification Search
CPC ....... H04W 72/04; H04W 8/00; H04W 4/005; H04W 8/005
(Continued)

(56) References Cited

U.S. PATENT DOCUMENTS 7,039,445 B1 * 5/2006 Yoshizawa .......... H04M 1/7253
343/754
8,060,105 B2 11/2011 Jung et al.
(Continued)

FOREIGN PATENT DOCUMENTS

WO 2008034023 A1 3/2008
WO 2009138820 A1 11/2009
(Continued)

OTHER PUBLICATIONS

Fodor, G. et al., "Design Aspects of Network Assisted Device-to-Device Communications," IEEE Communications Magazine, Mar. 2012, pp. 170-177.
(Continued)

*Primary Examiner* — Edan Orgad
*Assistant Examiner* — Vanneilian Lalchinthang
(74) *Attorney, Agent, or Firm* — Withrow & Terranova, PLLC

(57) ABSTRACT

A method for sending beacon signals is provided. The beacon signals are to be received by a slave device to discover the master device for Device to Device communication. The master device receives information from a network node. The information informs about a set of available peer discovery resources to be used in a peer discovery frame by the master device for sending beacon signals. The beacon signals are detected by the slave device. The master device obtains a beacon transmission probability. At each specific peer discovery frame, the master device determines according to the beacon transmission probability, (Continued)

whether or not a beacon signal shall be transmitted during that specific peer discovery frame. When determining to transmit a beacon signal during that specific peer discovery frame, master device sends the beacon signal by choosing one of the peer discovery resources out of the received set of available peer discovery resources.

26 Claims, 8 Drawing Sheets

(51) Int. Cl.
  *G06F 15/16* (2006.01)
  *H04W 72/04* (2009.01)
  *H04W 4/00* (2009.01)
  *H04W 8/00* (2009.01)

(58) Field of Classification Search
  USPC .......................................................... 370/329
  See application file for complete search history.

(56) References Cited

U.S. PATENT DOCUMENTS

| | | |
|---|---|---|
| 8,081,575 B2 | 12/2011 | Habetha |
| 8,804,590 B2 | 8/2014 | Nakae et al. |
| 9,319,931 B2 | 4/2016 | Lim et al. |
| 2003/0100343 A1 | 5/2003 | Zourntos et al. |
| 2005/0247775 A1 | 11/2005 | Gloekler et al. |
| 2006/0253736 A1 | 11/2006 | Rudolf et al. |
| 2007/0049317 A1 | 3/2007 | Qi et al. |
| 2007/0147317 A1 | 6/2007 | Smith et al. |
| 2007/0274275 A1 | 11/2007 | Laroia et al. |
| 2008/0069033 A1* | 3/2008 | Li .................. H04W 48/16 370/328 |
| 2008/0137577 A1 | 6/2008 | Habetha |
| 2008/0205340 A1 | 8/2008 | Meylan et al. |
| 2009/0017861 A1 | 1/2009 | Wu et al. |
| 2009/0203388 A1 | 8/2009 | Karaoguz |
| 2009/0323648 A1 | 12/2009 | Park et al. |
| 2010/0093364 A1 | 4/2010 | Ribeiro et al. |
| 2010/0202400 A1* | 8/2010 | Richardson ........... H04W 8/005 370/330 |
| 2011/0170431 A1 | 7/2011 | Palanki et al. |
| 2011/0176523 A1 | 7/2011 | Huang et al. |
| 2011/0258313 A1* | 10/2011 | Mallik .................. H04W 8/005 709/224 |
| 2011/0268101 A1* | 11/2011 | Wang .................... H04L 5/0053 370/344 |
| 2011/0317569 A1 | 12/2011 | Kneckt et al. |
| 2012/0163263 A1 | 6/2012 | Oh et al. |
| 2012/0207100 A1 | 8/2012 | Hakola et al. |
| 2012/0213075 A1 | 8/2012 | Koie et al. |
| 2012/0250636 A1* | 10/2012 | Wang .................... H04W 72/08 370/329 |
| 2012/0265818 A1* | 10/2012 | Van Phan .............. H04W 8/005 709/204 |
| 2013/0028177 A1 | 1/2013 | Koskela et al. |
| 2013/0059583 A1 | 3/2013 | Van Phan et al. |
| 2013/0083661 A1 | 4/2013 | Gupta et al. |
| 2013/0115967 A1 | 5/2013 | Soliman et al. |
| 2013/0163491 A1 | 6/2013 | Singh et al. |
| 2013/0178221 A1 | 7/2013 | Jung et al. |
| 2013/0195026 A1 | 8/2013 | Johnsson et al. |
| 2013/0212219 A1 | 8/2013 | Koskela et al. |
| 2013/0242840 A1 | 9/2013 | Tolhuizen et al. |
| 2013/0267269 A1 | 10/2013 | Fang et al. |
| 2013/0279381 A1 | 10/2013 | Sampath et al. |
| 2013/0316762 A1 | 11/2013 | Charbit et al. |
| 2014/0171062 A1* | 6/2014 | Fallgren ................ H04W 40/22 455/422.1 |
| 2014/0215594 A1 | 7/2014 | Lambert |
| 2014/0219095 A1 | 8/2014 | Lim et al. |
| 2014/0226639 A1* | 8/2014 | Yi ......................... H04W 74/04 370/336 |
| 2015/0237491 A1 | 8/2015 | Selén et al. |
| 2015/0237663 A1 | 8/2015 | Wilhelmsson et al. |

FOREIGN PATENT DOCUMENTS

| | | | |
|---|---|---|---|
| WO | 2011130630 | A1 | 4/2011 |
| WO | 2011063845 | A1 | 6/2011 |
| WO | 2012035367 | A1 | 3/2012 |
| WO | 2012069956 | A1 | 5/2012 |
| WO | 2014042568 | A1 | 3/2014 |

OTHER PUBLICATIONS

International Search Report and Written Opinion for PCT/SE2012/051144, mailed Feb. 23, 2013, 13 pages.
Eljack, Sarah et al., "Synchronized Multi-Channel Cognitive MAC protocol with Efficient Solutions for Second Spectrum Access," Symposia and Workshops on Ubiquitous, Autonomic and Trusted Computing, Jul. 7-9, 2009, IEEE, pp. 477-481.
Ke, Yi et al., "MCR-MAC: Multi-channel Cognitive Radio MAC Protocol for Cooperative Incumbent System Protection in Wireless Ad-hoc Network," First International Conference on Ubiquitous and Future Networks, Jun. 7-9, 2009, Hong Kong, China, IEEE, pp. 6-11.
International Search Report and Written Opinion for PCT/SE2012/050983, mailed Mar. 12, 2013, 13 pages.
International Search Report and Written Opinion for PCT/SE2012/050981, mailed Jun. 14, 2013, 12 pages.
Baccelli, Francois, et al., "On the Design of Device-to-Device Autonomous Discovery," Fourth International conference on Communication Systems and Networks (COMSNETS), Jan. 3-7, 2012, Bangalore, India, IEEE, 9 gages.
Doppler, Klaus, et al., "Advances in D2D Communications: Energy efficient Service and Device Discovery Radio," 2nd International Conference on Wireless Communication, Vehicular Technology, Information Theory and Aerospace & Electronic Systems Technology (Wireless VITAE), Feb. 28-Mar. 3, 2011, Chennai, India, IEEE, 6 pages.
Doppler, Klaus, et al., "Device-to-Device Communication as an Underlay to LTE-Advanced Networks," IEEE Communications Magazine, vol. 47, Issue 12, Dec. 2009, IEEE, pp. 42-49.
Drula, Catalin, et al., "Adaptive Energy Conserving Algorithms for Neighbor Discovery in Opportunistic Bluetooth Networks," IEEE Journal on Selected Areas in Communication, vol. 25, Issue 1, Jan. 2007, IEEE, pp. 96-107.
Zhang, Lei, et al., "Neighbor Discovery in Wireless Networks Using Compressed Sensing with Reed-Muller Codes," International Symposium of Modeling and Optimization of Mobile, Ad Hoc, and Wireless Networks, May 9-13, 2011, Princeton, New Jersey, IEEE, pp. 154-160.
Final Office Action for U.S. Appl. No. 14/428,877, mailed Jun. 22, 2016, 33 pages.
Advisory Action for U.S. Appl. No. 14/428,877, mailed Sep. 1, 2016, 2 pages.
Non-Final Office Action for U.S. Appl. No. 14/428,877, dated Jan. 12, 2016, 23 pages.
Author Unknown, "A New Regulatory and Technical Environment for Wireless Broadband: A Primer on the IEEE 802.11y Amendment," Wi-Fi Alliance Discussion Paper, www.wi-fidev.org/knowledge_center_overview.php? docid=4570, Oct. 2008, Wi-Fi Alliance, pp. 1-7.
Herrera, Moisés, et al., "Performance Study of Non-beaconed and Beacon-Enabled Modes in IEEE 802.15.4 Under Bluetooth Interference," The Second International Conference on Mobile Ubiquitous Computing, Systems, Services and Technologies (UBICOMM), Sep. 29-Oct. 4, 2008, IEEE Computer Society, pp. 144-149.
Non-Final Office Action for U.S. Appl. No. 14/424,709, dated Mar. 29, 2017, 14 pages.
Notice of Allowance for U.S. Appl. No. 14/428,877, dated Feb. 17, 2017, 5 pages.

(56) References Cited

OTHER PUBLICATIONS

Final Office Action for U.S. Appl. No. 14/424,709, dated Jun. 23, 2017, 9 pages.

* cited by examiner

| Network Assistance Level | Synchronization | Broadcast the Number of Active Masters | Broadcast the Number of Active Slaves | Inform Available PDR | Registration | |
|---|---|---|---|---|---|---|
| | | | | | Master | Slave |
| NAL0 | YES | — | — | Broadcast | — | — |
| NAL1 | YES | Upon registration | — | Broadcast | YES | — |
| NAL2 | YES | Upon registration | Upon registration (optional) | Broadcast | YES | YES |
| NAL3 | YES | Continuous | Upon registration (optional) | Broadcast | YES | YES |
| NAL4 | YES | — | — | Unicast | YES | YES |

Fig. 8

METHOD AND ARRANGEMENT FOR D2D DISCOVERY

This application is a 35 U.S.C. §371 national phase filing of International Application No. PCT/SE2012/051144, filed Oct. 24, 2012, which claims priority to U.S. Provisional Application No. 61/661,362, filed Jun. 19, 2012, the disclosures of which are incorporated herein by reference in their entireties.

TECHNICAL FIELD

Embodiments herein relate to a network node, a master device and methods therein. In particular, it relates to assisting in Device to Device, D2D, discovery and to sending beacon signals for D2D discovery.

BACKGROUND

Communication devices such as User Equipments (UEs) are also known as e.g. terminals, mobile terminals, wireless terminals and/or mobile stations. User equipments are enabled to communicate wirelessly in a cellular communications network or wireless communication system, sometimes also referred to as a cellular radio system or cellular networks. The communication may be performed e.g. between two user equipments, between a user equipment and a regular telephone and/or between a user equipment and a server via a Radio Access Network (RAN) and possibly one or more core networks, comprised within the cellular communications network.

User equipments may further be referred to as mobile telephones, cellular telephones, laptops, or surf plates with wireless capability, just to mention some further examples. The user equipments in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area is served by a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pica base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the user equipments within range of the base stations. In the context of this disclosure, the expression Downlink (DL) is used for the transmission path from the base station to the user equipment. The expression Uplink (UL) is used for the transmission path in the opposite direction i.e. from the user equipment to the base station. The DL is sometimes also referred to as a forward link, while the UL is sometimes also referred to as a reverse link.

In 3rd Generation Partnership Project (3GPP) Long Term Evolution (LTE), base stations, which may be referred to as eNodeBs or even eNBs, may be directly connected to one or more core networks.

Universal Mobile Telecommunications System (UMTS) is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipments. The 3GPP has undertaken to evolve further the UTRAN and GSM based radio access network technologies.

3GPP LTE radio access standard has been written in order to support high bitrates and low latency both for uplink and downlink traffic. All data transmission is in LTE is controlled by the radio base station.

In ad hoc networking, neighbor discovery refers to a procedure that allows wireless devices in the proximity of each other to detect the presence of one another. Neighbor discovery in ad hoc networks involves an engineering tradeoff between energy efficiency, discovery range, the number of discovered devices and the discovery time. Typically, ad hoc technologies such as Bluetooth deal with this problem by carefully designing beacon signaling procedures and employing state transitions between energy conserving and active, i.e. beacon transmitting and detecting states.

In so called network assisted device discovery, the classical ad hoc discovery process may be enhanced by network signaling so as to provide synchronization between devices, and using network-device signaling that makes devices aware of the reserved resources for beacon signaling and a bit pattern employed by the beacon signals. Such network signaling can thus eliminate beacon collisions and make rendezvous' between advertising and capturing type of devices in time and frequency less time consuming.

However, network assistance through network-device signaling increases the processing load in network nodes and requires a significant amount of spectrum resources and may have scalability problems as the number of devices per cell increases.

Device discovery is a well-known and widely used component of many existing wireless technologies, including ad hoc and cellular networks. Examples include Bluetooth, several variants of the IEEE 802.11 standards suite, such as WiFi Direct. The key technique used by these standards is to use specially designed beacon signals that so called master devices can broadcast and so called slave devices can capture, so that nearby slave devices can detect the proximity as well as some characteristics of such beacon broadcasting devices. Beacon signaling based device discovery requires that the broadcasting and capturing devices meet in the time, frequency and code domains. Furthermore, in order for discovery to work, the slave device capturing beacon signals must be able to decode the information encoded in the beacon signal. In other words, the beacon signal must reach a certain Signal to Interference plus Noise Ratio (SINR) threshold at the capturing slave device in order for it to be useful for device discovery. A device sending beacon signals is referred to as a master device and a device capturing the beacon signals is referred to as a slave device.

Recently, Device-to-Device (D2D) communications as an underlay to cellular networks has been provided as a means to take advantage of the proximity of communicating devices and at the same time to allow devices to operate in a controlled interference environment. Various device discovery techniques applicable for devices in cellular spectrum have also been discussed recently. These techniques make use of various forms of network assistance, such as obtaining synchronization, Peer Discovery Resources (PDR) or tuning other parameters of the discovery process.

Although device discovery for ad hoc networking type of technologies such as Bluetooth, WiFi Direct, etc. is a relatively mature technology, only very few existing techniques have been built for devices operating in cellular spectrum.

There are also a few disclosed solutions discussed for device discovery for devices operating in cellular spectrum considering in general D2D cellular communications as a special type of ad-hoc communication involving only two communicating devices via a direct radio link.

The problem of today's procedure for device discovery is that if there are many master devices in vicinity of each other, they use colliding peer discovery resources for the bacon signals. Such collisions of beacon signals make beacon signals undetectable or not decodable by surrounding slave devices. This make the discovery of such master devices difficult if not impossible by other slave devices in the neighborhood.

SUMMARY

Therefore an object of embodiments herein is to provide an improved procedure for device discovery for D2D communication.

According to a first aspect of embodiments herein, the object is achieved by a method in a master device for sending beacon signals. The beacon signals are to be received by a slave device to discover the master device for Device to Device, D2D, communication. The master device is comprised in a wireless network. The master device receives information from a network node. The information informs about a set of available peer discovery resources to be used in a peer discovery frame by the master device for sending beacon signals. The beacon signals are to be detected by the slave device. The master device obtains a beacon transmission probability. The beacon transmission probability is the probability that the master device transmits a beacon signal in a specific peer discovery frame. At each specific peer discovery frame, the master device determines according to the beacon transmission probability, whether or not a beacon signal shall be transmitted during that specific peer discovery frame. When determining to transmit a beacon signal during that specific peer discovery frame, the master device sends the beacon signal by choosing one of the peer discovery resources out of the received set of available peer discovery resources.

According to a second aspect of embodiments herein, the object is achieved by a method in a network node for assisting in Device to Device, D2D, discovery. The network node is comprised in a wireless network. The network node receives from respective one or more master devices, a registration that the master device requests to be detected by a slave device. The network node sends information to the respective one or more master devices. The information comprises the number of registered master devices and a set of available peer discovery resources. The set of available peer discovery resources is to be used in a peer discovery frame by the respective one or more master devices for sending beacon signals. The beacon signals are to be received by slave devices to discover the master device for D2D communication.

According to a third aspect of embodiments herein, the object is achieved by a master device for sending beacon signals. The beacon signals are to be received by a slave device to discover the master device for Device to Device, D2D, communication. The master device is comprised in a wireless network. The master device comprises a receiving circuit configured to receive from a network node 110 information about a set of available peer discovery resources to be used in a peer discovery frame by the master device for sending beacon signals. The beacon signals are to be detected by the slave device. The master device further comprises an obtaining circuit configured to obtain a beacon transmission probability. The beacon transmission probability is the probability that the master device transmits a beacon signal in a specific peer discovery frame.

The master device further comprises a sending circuit configured to at each specific peer discovery frame determine according to the beacon transmission probability, whether or not a beacon signal shall be transmitted during that specific peer discovery frame, and when determining to transmit a beacon signal during that specific peer discovery frame, send the beacon signal by choosing one of the peer discovery resources out of the received set of available peer discovery resources.

According to a fourth aspect of embodiments herein, the object is achieved by a network node for assisting in Device to Device, D2D, discovery. The network node is comprised in a wireless network. The network node comprises a receiving circuit configured to receive from respective one or more master devices, a registration that the master device requests to be detected by a slave device. The network node further comprises a sending circuit configured to send information to the respective one or more master devices. The information comprises the number of registered master devices and a set of available peer discovery resources. The set of available peer discovery resources are to be used in a peer discovery frame by the respective one or more master devices for sending beacon signals. The beacon signals are to be received by slave devices to discover the master device for D2D communication.

Since the master device at each specific peer discovery frame, determines according to the beacon transmission probability, whether or not a beacon signal shall be transmitted during that specific peer discovery frame. And since the master device when determining to transmit a beacon signal during that specific peer discovery frame, it sends the beacon signal by choosing one of the peer discovery resources out of the received set of available peer discovery resources, less network signalling is required in the discovery process and the beacons transmitted by different master nodes will avoid colliding with one another. Thus embodiments herein provides help to master devices to cooperate in the discovery process rather than making the master devices to compete for peer discovery resources as existing solutions do. This cooperation is made possible by the presence of the network node that helps the master devices without excessive, i.e. per-node signaling as some other prior art techniques suggest. This results in an improved procedure for device discovery for D2D communication.

BRIEF DESCRIPTION OF THE DRAWINGS

Examples of embodiments herein are described in more detail with reference to attached drawings in which:

FIG. 8 is a table illustrating embodiments herein.

DETAILED DESCRIPTION

Figure 1:
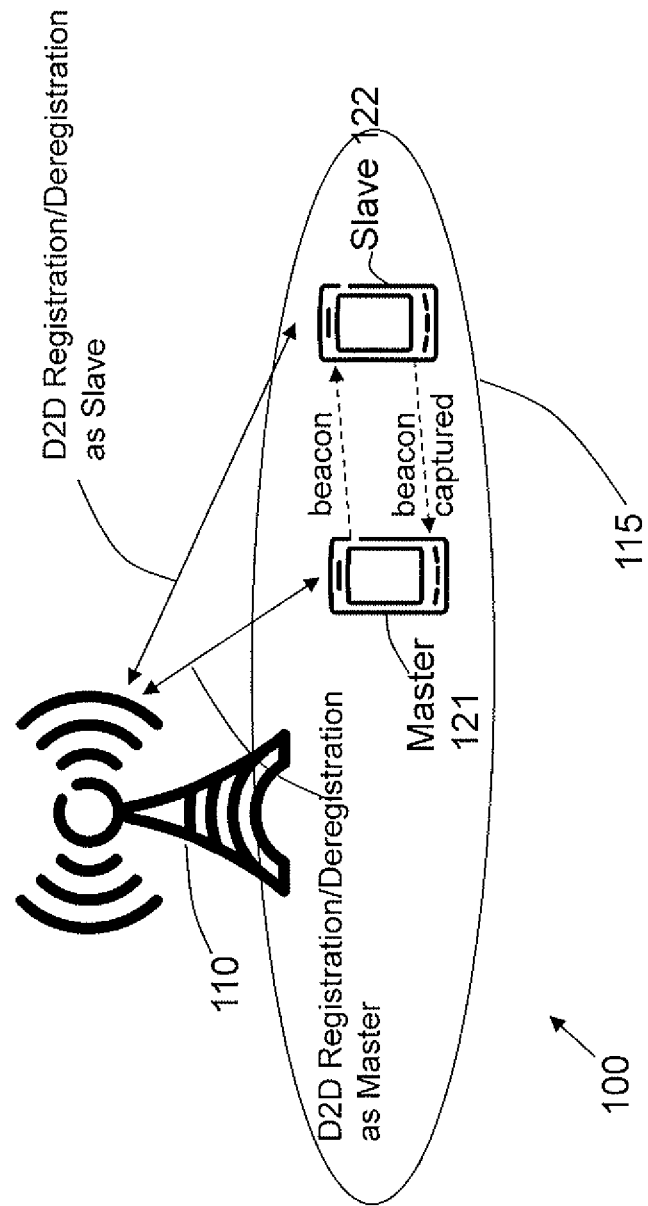
FIG. 1 is a schematic block diagram illustrating embodiments of networks.

As part of developing embodiments herein a problem will first be identified and discussed.

The problem of existing solutions is that they do not allow a device beacon signalling activity, i.e. how often a device transmits or broadcasts beacon signals, to be adaptive relative to the number of available peer discovery resources, the number of surrounding other devices using overlapping spectrum resources for beacon transmissions, and to the receiver sensitivity of the surrounding devices that may capture transmitted beacon signals. The root cause of this problem is that the devices using existing technology do not have up-to-date knowledge about the load in the system such as number of advertising i.e. beacon signalling nodes, and the total amount of peer discovery resources that may be used for beacon signalling.

A further related problem is that devices do not know how to take advantage of network assistance data in terms of selecting neighbor discovery resources when transmitting beacon signals. This leads to situations, in which multiple devices in the vicinity of each other use colliding peer discovery resources. Such collisions of beacon signals make beacon signals undetectable or not decodable by surrounding devices. This makes the discovery of such devices difficult if not impossible by other devices in the neighborhood.

As mentioned above, network assistance through network to device signaling increases the processing load in network nodes, requires a significant amount of spectrum resources, and may have scalability problems as the number of devices per cell increases. Therefore, there is a need for a neighbor discovery mechanism that makes use of network assistance in the discovery process with a minimal amount of network signaling. Preferably, the network assistance should be such that it scales with the number of devices that need to be discovered by one another within the coverage area of a cell or some other registration or network assistance area. Ideally, the network assistance should minimize the used energy while guaranteeing a desired discovery rate, relative number of discovered devices, within a given discovery time.

A problem is to decide what pieces of information, through what signaling the network should provide to which devices in, for example, the coverage area of a cellular base station and how the network nodes devices transmitting and receiving beacon signals should make use of or behave according to, the assisting information supplied by the network.

Embodiments herein provides a combination of mechanisms at the network, and specifically at cellular base station, beacon advertising types of devices, referred to as "masters" or "master devices" in this document, and beacon capturing type of devices referred to as "slaves" or "slave devices" in this document. The interplay between these mechanisms allows master devices to autonomously pick peer discovery resources, i.e. resources in the time and frequency domain for beacon transmissions, in such a fashion that beacon collision probabilities are controlled by the network. For example, in one embodiment a master device may maximize their so called collision free beacon transmission probabilities with a minimum amount of network signaling.

FIG. 1 depicts a wireless network 100 in which embodiments herein may be implemented. The wireless network 100 is a wireless communication network such as an LTE (e.g. LTE FDD, LTE TDD, LTE HD-FDD), WCDMA, UTRA TDD, GSM network, GERAN network, enhanced data rate for GSM evolution (EDGE) network, network comprising of any combination of RATs such as e.g. Multi-Standard Radio (MSR) base stations, multi-RAT base stations etc., any 3GPP cellular network, Wimax, Wireless Local Area Networks (WLAN), or any cellular network or system.

The wireless network 100 comprises a plurality of network nodes whereof one, a network node 110 is depicted in FIG. 1. The network node 110 may be referred to as the NW node. The network node 110 may be a radio base station such as e.g. an eNB, an eNodeB, or an Home Node B, an Home eNode B, a wireless Access Point (AP) or any other network node capable to serve a user equipment or a machine type communication device in a cellular communications network. The network node 110 is serving a cell 115.

A number of user equipments are located in the cell 115 served by the network node 110, in the example scenario of FIG. 1, only two user equipments are shown in the cell 115. One of them is a first user equipment. The first user equipment is a master device in this scenario and is therefore referred to as the master device 121. The cell 115 may comprise one or more master devices 121.

Further, one or more second user equipments are located in the cell 115, whereof one second user equipment is shown in FIG. 1. The second user equipment is a slave device in this scenario and is therefore referred to as the slave device 122. However, both the first and second user equipment may act as both slave device or master device.

The master device 121 and the slave device 122 are capable of communicating with user equipments in its respective vicinity using D2D communication. The master device 121 and the slave device 122 are further capable of accessing the wireless network 100 via the network node 110 when they are located in the cell 115. The master device 121 and the slave device 122 may e.g. be mobile terminals or wireless terminals, mobile phones, computers such as e.g. laptops, Personal Digital Assistants (PDAs) or tablet computers, sometimes referred to as surf plates, with wireless capability, Machine-to-Machine (M2M) devices or any other radio network units capable to communicate over a radio link in a cellular communications network.

Devices such as the master device 121 and the slave device 122 in FIG. 1, attempt to discover devices in a local range that can provide a given type of service. The master device 121 may make use of some D2D technology and broadcast a beacon signal which may be received by a peer such as the slave device 122, thereby enabling device discovery. There may be multiple D2D technologies in operation which may carry a beacon signal. Possible options include 802.11 WLAN, Bluetooth, or a possible future D2D extension of LTE, or other technologies such as the wireless sense technology.

According to embodiments herein, the master device 121 may transmit beacon signals in certain predetermined frames and only with a certain, network controlled transmit probability. Furthermore when slave devices such as the slave device 122 capture beacon signals, they may inform the wireless network 100 and/or the master devices such as the master device 121. This allows both the wireless network 100 and the master devices to adaptively adjust both the peer discovery resources and the beacon transmit probabilities with which the master devices may transmit beacon signals. A further component of this mechanism is that master devices such as the master device 121 that have been discovered by a certain number of slave devices stop transmitting beacon signals, allowing other master devices to reach the necessary SINR for their beacon signals at slave devices.

Thus embodiments herein provides help to master devices such as the master device 121 to cooperate in the discovery process rather than making the master devices to compete for peer discovery resources as existing solutions do. This cooperation is made possible by the presence of the wireless network 100 that helps the master devices such as the master device 121 without excessive, i.e. per-node signaling as some other prior art techniques suggest.

Some rudimentary performance analysis of the provided scheme is provided below according to embodiments herein. Further, it is showed that a network orchestrated master device cooperation yields close to per-node signaling based performance in terms of discovery time and used energy at the faction of the signaling cost.

Figure 2:
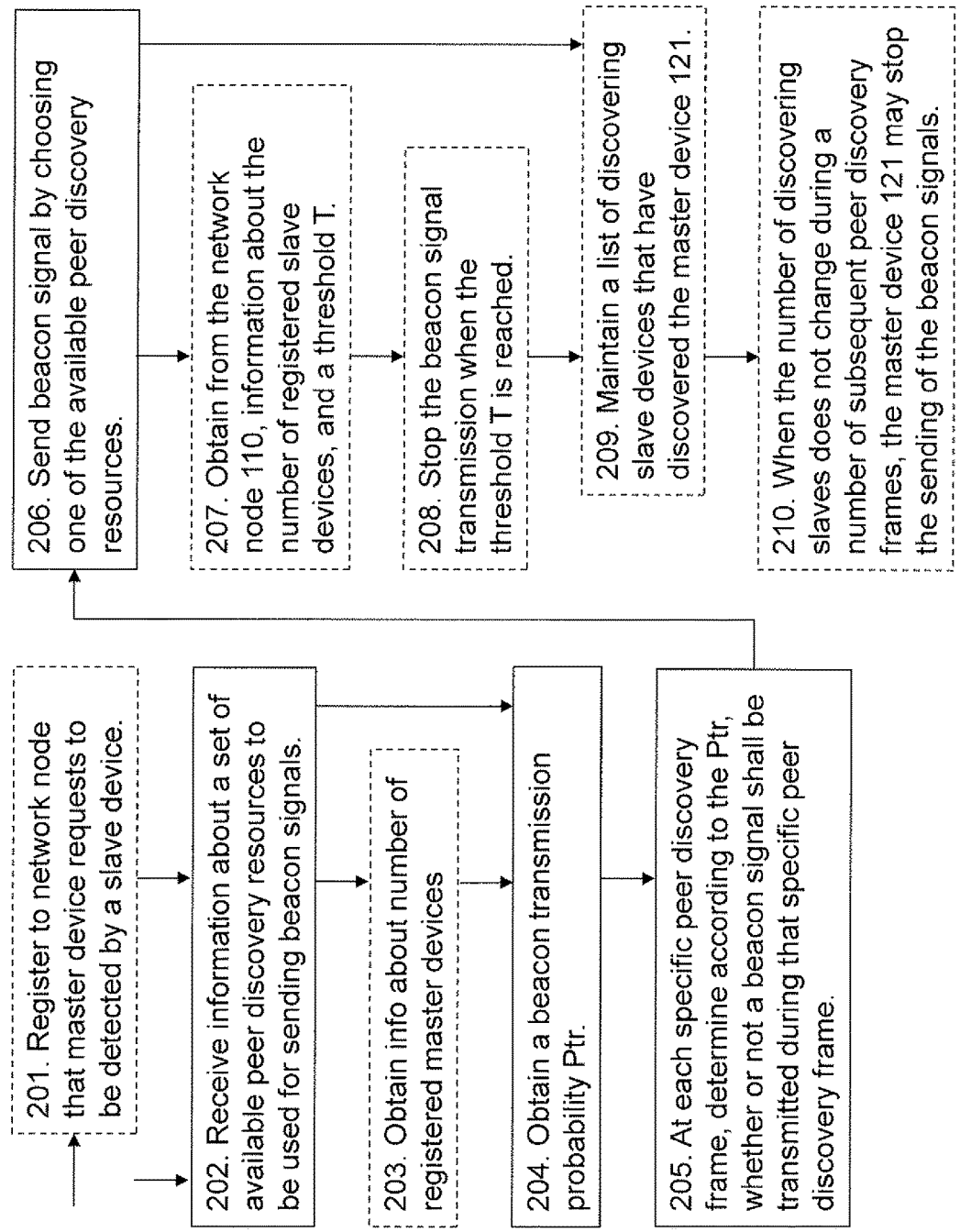
FIG. 2 is a flowchart depicting embodiments of a method in a master device.

Example of embodiments of a method in the master device 121 for sending beacon signals will now be described with reference to a flowchart depicted in FIG. 2. Here the method is discussed seen from the perspective of the master device 121. The beacon signals are to be received by the slave device 122 to discover the master device 121 for D2D communication. As mentioned above, the master device 121 is comprised in the wireless network 100.

In this example scenario, the master device 121 requires to find a device for D2D communication. The method comprises the following actions, which actions may be taken in any suitable order. Dashed lines of some boxes in FIG. 2 indicate that this action is optional and not mandatory.

Action 201

In some embodiments, the master device 121 registers to the network node 110 by signalling that the master device 121 requests to be detected by a slave device 122. Registration allows the network node 110 to know the number of master devices in a geographical area such as a cell or tracking area. This knowledge, as will be explained later, is useful for the network node 110 to know the necessary amount of resources that must be allocated for the beacon transmissions.

This registration action may comprise a two-way signaling, also referred to as handshaking, between the master devices including the master device 121, and the network node 110. An example of such signaling is a new Radio Resource Control (RRC) signaling exchange, in a similar fashion as an existing RRC signaling for signaling bearer setup.

Action 202

The master device 121 receives information from the network node 110. The information comprises a set of available peer discovery resources to be used in a peer discovery frame by the master device 121 for sending beacon signals. The beacon signals are to be detected by the slave device 122.

The information of the available peer discovery resources may be signalled or broadcasted e.g. with a low duty cycle by the network node 110.

The information about the set of available peer discovery resources may further comprise information about which Orthogonal Frequency Multiple Access (OFDM) frame to be used by the master device 121 as the peer discovery frame for sending the beacon signals.

In some embodiments, as an acknowledgment (ACK) for the registration requested by the master device 121 in action 201, the network node 110 signals back the set of peer discovery resources that may be used by the master device 121. Such peer discovery description may comprise the exact LTE frames, peer discovery frame, identified by specific sequence frame numbers, SFNs, known in the state of the art to identify LTE frames, and the set of peer discovery resources in the form of OFDM Physical (PHY) Resource Blocks (PRB) within such frames that the master device 121 may use for broadcasting beacon signals. Peer discovery frames will be discussed more in detail below in relation to FIG. 6.

Action 203

If the master device 121 shall determine the so called beacon transmit probability itself according to some embodiments which will be performed in action 204 below, the master device 121 needs two pieces of information, the number of currently active master devices within the cell or tracking area and the total number of available peer discovery resources. To achieve one of the pieces of information, the master device 121 obtains information from the network node 110 in this optional action. The information comprises the number of registered master devices within a cell or tracking area associated with the network node 110.

The network node 110 may maintain a list of registered, i.e. active master devices within the coverage area of a cell such as the cell 115 or tracking area. The network node 110, e.g. a single eNB or a set of eNBs in a specific LTE tracking area, may continuously broadcast, e.g. with a low duty cycle, the current number of registered master devices with the coverage area of the served cell or tracking area.

Action 204

The master device 121 obtains a beacon transmission probability. The beacon transmission probability is the probability that the master device 121 transmits a beacon signal in a specific peer discovery frame.

The beacon transmission probability may be obtained by being determined by the master device 121, or by being determined by and received from the network node 110 in a transmission.

As mentioned above, the master device 121 may use the two pieces of information to determine the beacon transmit probability. Therefore, in some embodiments the beacon transmission probability is obtained by determining the beacon transmission probability based on the number of available peer discovery resources in the peer discovery resource set and the number of active master devices. The beacon transmission probability may as an alternative be received from the network node 110 in a transmission. The obtaining of the beacon transmission probability will be described more in detail below.

Action 205

At each specific peer discovery frame the master device 121 determines according to the beacon transmission probability, whether or not a beacon signal shall be transmitted during that specific peer discovery frame.

At the time of each peer discovery frame, the master device 121 flips a coin that allows beacon transmission in that specific peer discovery frame with probability Ptr. Flipping a coin means drawing a random number according to the uniform distribution between zero and 1, that is in the interval (0;1).

This means that at each peer discovery frame, the master device 121 may determine according to a predefined probability distribution whether the master device 121 shall transmit a beacon signal during that peer discovery frame or not. The predefined probability distribution may, for example, be, for each frame:

Probability of [The master device 121 should transmit a beacon signal in the upcoming peer discovery frame]=Ptr Probability of [The master device 121 should not transmit a beacon in the upcoming peer discovery frame]=1-Ptr, where the Probability is determined by the Operation and Maintenance Subsystem and stored for the base station. Probability means the "Probability" of a defined event, where the defined event stands in brackets after "Probability of".

This probability distribution with the associated Ptr parameter may be provided to the master devices as part of a network assistance, depending on the network assistance level.

Action 206

When determining to transmit a beacon signal during that specific peer discovery frame, the master device 121 sends the beacon signal by choosing one of the peer discovery resources out of the received set of available peer discovery resources.

For example, once a Master determines the beacon transmission probability Ptr, it executes the following beacon transmission procedure. As mentioned above, at the time of each peer discovery frame, the master device 121 flips a coin, i.e. draws a random number according to the uniform distribution between (0,1), that allows beacon transmission in that specific peer discovery frame with probability Ptr. If the master device 121 transmits a beacon in that frame, it autonomously picks one peer discovery resource out of the available ones, as it was indicated by the network node in action 202. This means that if the master device 121 decides that the beacon signal shall be transmitted during that specific peer discovery frame, it picks one out of the set of available peer discovery resources.

As a result of beacon signal transmissions by multiple master devices including the master device 121, typically some beacon signals suffer collisions, i.e. multiple master devices picking the same peer discovery resource within a peer discovery frame, while other beacon signals remain collision free. As a result, the slave devices such as the slave device 122, within the coverage area of the network node 110 may experience an SINR distribution of different beacon signals arriving at different time-frequency resource blocks. Slave devices at different geographical positions may thus discover different set of master devices, depending on which beacon signals exceed an SINR threshold at a specific slave device, e.g. the slave device 122.

Action 207

In some embodiments, the master device 121 obtains, i.e. receives from the network node 110, information about the number of slave devices that have registered at the network node 110. In some of these embodiments, the master device 121 further obtains, i.e. receives a threshold value T that the master device 121 shall use as a target rate for a discovering rate of the number of registered slave devices with respect to the number of registered slave devices may be performed by the network node 110 continuously broadcasting the information and the threshold value, with a low duty cycle.

The threshold value T is the proportion of slave devices that discover any master device by detecting a beacon signal sent by the master device 121 compared to the total number of slaves that registered at the network node 110. This threshold value T may be typically between 50-70% and, as it should be clear for the skilled person in the art, it depends on the coverage area of the cell or tracking area, the maximum transmit power of master devices and the type of application that the master device 121 is running. Such applications may be proximity based social networking such as Facebook Places, Glancee, Fourthsquare. Other applications are broadcasting commercials and advertisements by a local store or shop to bypassing pedestrians using a user equipment. Yet other applications may be traffic announcements to cars driving by a traffic information point or roadside infrastructure point. For some applications, the master device 121 may wish to find a single, any one, slave device, a specific single slave device or it may want to be detected by as many slave devices as possible. Also optionally, the network node 110 broadcasts a bit that indicates whether master devices such as the master device 121 must respect the threshold or whether they may continue sending beacon signals even after reaching the threshold in action 208.

Action 208

The master device 121 may stop the beacon signal transmission when the threshold T is reached.

If the total number of registered slave devices and the threshold value are made available by the network node 110, the master device 121 may stop advertising i.e. sending beacon signals, when the number of discovering slave devices on its list has reached the number of slaves determined by the total number of slaves and the T threshold.

This action to stop sending beacon signals may be mandatory or optional by the master device 121. Note that master devices may be obliged to stop beaconing when the number of discovering slave devices has reached the T threshold, as indicated by the scope bit in Action 207.

Action 209

In some embodiments, the master device 121 may maintain a list of slave devices that have discovered the master device 121.

For example, when the slave device 122 succeeds decode a beacon signal and thereby identify the identity or some characteristics of the master device 121 that issued that beacon signal may send a so called paging signal, e.g. comprising the identity of the slave device back to the master device 121. If the master device 121 receives such a paging signal from the slave device 122 and/or any other slave device, it may updates its list of slaves that discovered it. That is, according to some embodiments herein, the master device 121 may maintain a list of slave devices from whom it received a paging signal and which slave devices the master device 121 considers as so called discovering slave devices. The advantage of this is that the master device 121 can stop transmitting beacons such as e.g. in Action 210. Stopping transmitting beacons comprises the following advantages:

The master device 121 consumes less energy since it may switch off its transmitter circuitry;

The master device 121 does not cause interference any more on the beacon resources that it was previously using;

The resource blocks that the master device 121 was using can be allocated to other master devices or to cellular traffic.

Action 210

When the number of discovering slaves does not change during a number of subsequent peer discovery frames, the master device 121 may stop the sending of the beacon signals. This is because the master device 121 realizes that there are no slave devices in the proximity so there is no reason why further beacon signalling should be used. Stop sending the beacon signals has the above mentioned advantages.

This will be further discussed below.

Figure 3:
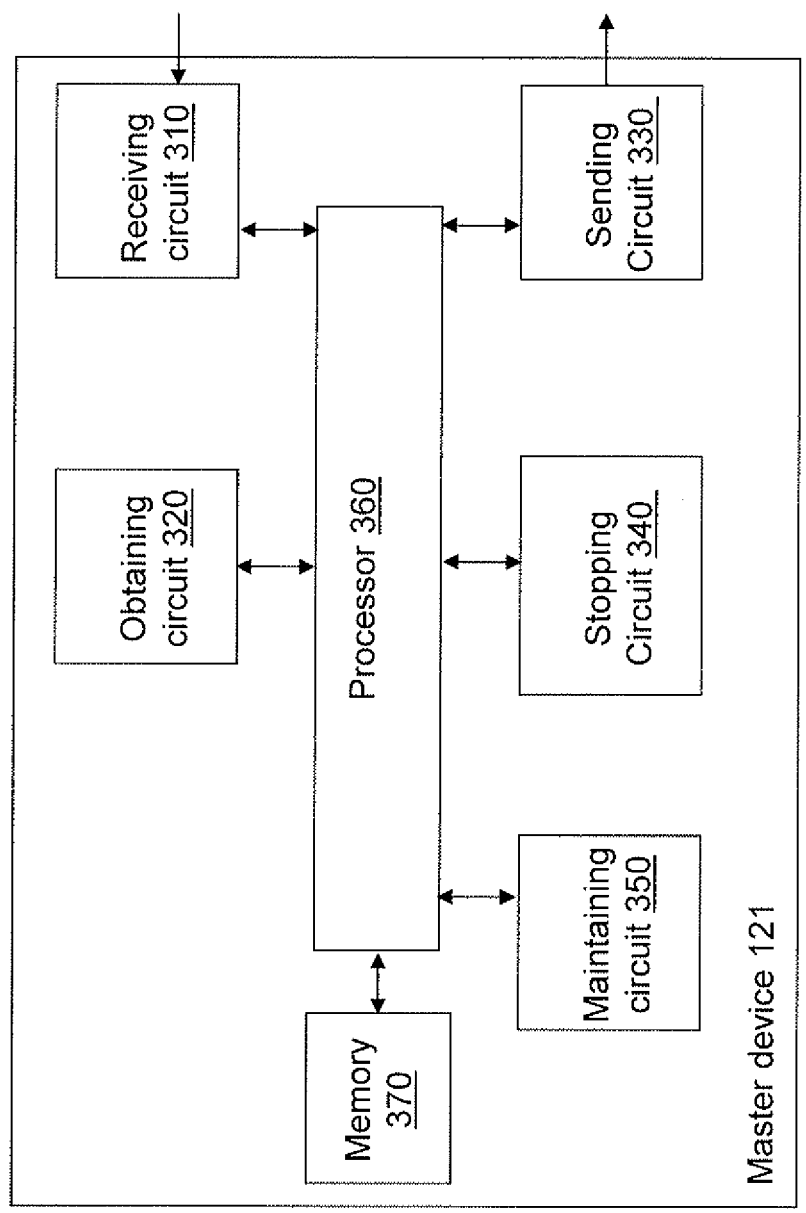
FIG. 3 is a schematic block diagram illustrating embodiments of master device.

To perform the method actions for sending beacon signals, the master device 121 comprises the following arrangement depicted in FIG. 3. As mentioned above, the beacon signals are to be received by the slave device 122 to discover the master device 121 for D2D communication. The master device 121 is comprised in the wireless network 100.

The master device 121 comprises a receiving circuit 310 configured to receive from a network node 110 information about a set of available peer discovery resources to be used in a peer discovery frame by the master device 121 for sending beacon signals. The beacon signals are to be detected by the slave device 122.

The master device 121 further comprises an obtaining circuit 320 configured to obtain a beacon transmission probability. The beacon transmission probability is the probability that the master device 121 transmits a beacon signal in a specific peer discovery frame.

The obtaining circuit 320 may further be configured to obtain from the network node 110, information about the number of registered master devices within a cell or tracking area associated with the network node 110. The obtaining circuit 320 may further be configured to obtain the beacon transmission probability by determine the beacon transmission probability based on the number of available peer discovery resources in the peer discovery resource set and the number of active master devices.

The beacon transmission probability may as an alternative be received from the network node 110 in a transmission.

In some embodiments, the information about the set of available peer discovery resources further comprises which OFDM, frame to be used by the master device 121 as the specific peer discovery frame for sending the beacon signals.

The obtaining circuit 320 may further be configured to obtain from the network node 110, information about the number of slave devices that have registered at the network node 110 and a threshold value T that the master device 121 shall use as a target rate for a discovering rate of the number of registered slave devices with respect to the number of registered slave devices.

The master device 121 further comprises a sending circuit 330 configured to at each specific peer discovery frame determine according to the beacon transmission probability, whether or not a beacon signal shall be transmitted during that specific peer discovery frame.

The sending circuit 330 is further configured to, when determining to transmit a beacon signal during that specific peer discovery frame, send the beacon signal by choosing one of the peer discovery resources out of the received set of available peer discovery resources.

The sending circuit 330 may further be configured to register to the network node 110 by signalling that the master device 121 requests to be detected by a slave device 122.

In some embodiments, the master device 121 further comprises a stopping circuit 340 configured to stop the beacon signal transmission when the threshold T is reached.

The stopping circuit 340 may further be configured to stop the sending of the beacon signals when the number of discovering slaves does not change during a number of subsequent peer discovery frames.

The master device 121 may further comprise a maintaining circuit 350 configured to maintain a list of slave devices that have discovered the master device 121.

The embodiments herein for sending beacon signals may be implemented through one or more processors, such as a processor 360 in the master device 121 depicted in FIG. 3, together with computer program code for performing the functions and actions of the embodiments herein. The program code mentioned above may also be provided as a computer program product, for instance in the form of a data carrier carrying computer program code for performing the embodiments herein when being loaded into the master device 121. One such carrier may be in the form of a CD ROM disc. It is however feasible with other data carriers such as a memory stick. The computer program code may furthermore be provided as pure program code on a server and downloaded to the master device 121.

The first network node 111 may further comprise a memory 370 comprising one or more memory units. The memory 370 is arranged to be used to store requests, and information mentioned above. The memory 370 is further arranged to store data, configurations, schedulings, and applications to perform the methods herein when being executed in the master device 121.

Those skilled in the art will also appreciate that the receiving circuit 310, the obtaining circuit 320, the sending circuit 330, the stopping circuit 340, and the maintaining circuit 350 described above may refer to a combination of analog and digital circuits, and/or one or more processors configured with software and/or firmware, e.g. stored in a memory such as the memory 370, that when executed by the one or more processors such as the processor 360 perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Figure 4:
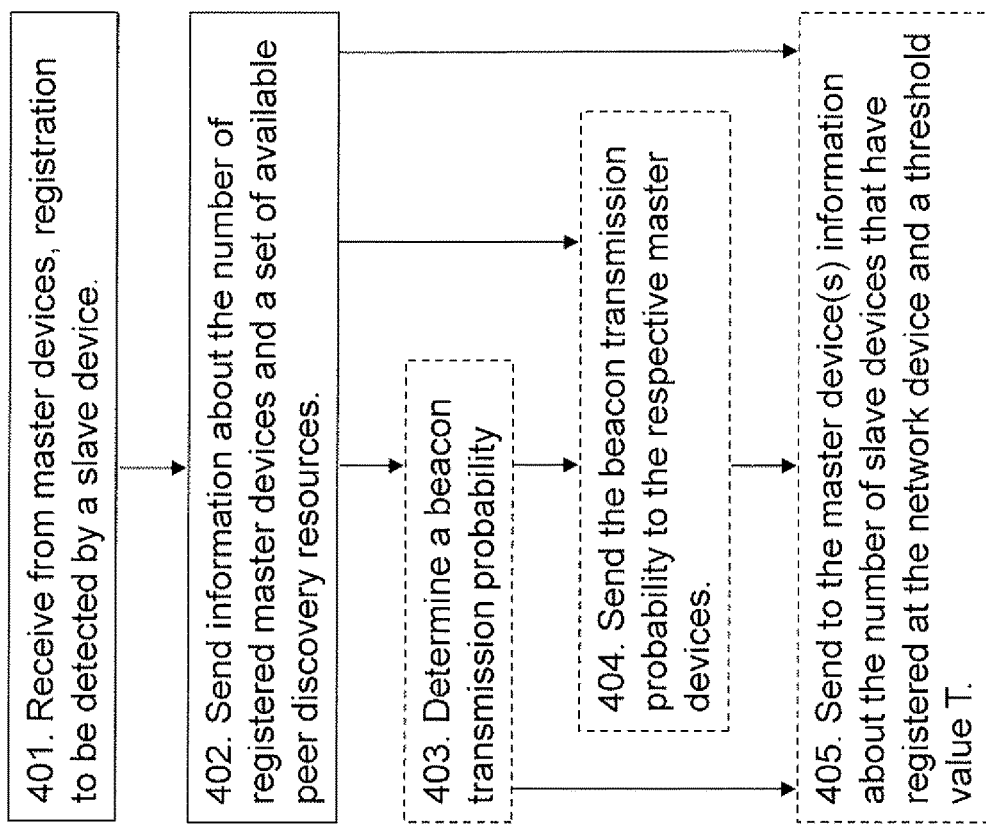
FIG. 4 is a flowchart depicting embodiments of a method in a network node.

Example of embodiments of a method in the network node 110 for assisting in Device to Device, D2D, discovery, will now be described with reference to a flowchart depicted in FIG. 4. Here the method is discussed seen from the perspective of the network node 110. As mentioned above, the network node 110 is comprised in a wireless network 100.

The method comprises the following actions, which actions may be taken in any suitable order. Dashed lines of some boxes in FIG. 4 indicate that this action is optional and not mandatory.

Action 401

The network node 110 receives from respective one or more master devices 121, a registration that the master device 121 requests to be detected by a slave device 122. In this way the master device 121 gets registered at the network node 110.

As mentioned above, the network node 110 may maintain a list of active, i.e. registered master devices within a coverage area of a cell or tracking area. In that case that network node 110 adds the master device 121 to the list as registered, i.e. active, when it receives the registration.

Action 402

The network node 110 sends information to the respective one or more master devices 121. The information comprises the number of registered master devices 121 and a set of available peer discovery resources. The set of available peer discovery resources are to be used in a peer discovery frame by the respective one or more master devices 121 for sending beacon signals. The beacon signals are to be received by slave devices 122 to discover the master device 121 for D2D communication.

The information may be sent by broadcast, e.g. continuously over a coverage area of the network node 110, which allows continuous adjustment of the beacon transmission probabilities by the one or more master devices 121.

The information may further be sent as an ACK for the registration request by the master device 121 in Action 401. Although broadcasting is done with a low duty cycle, it may be several orders of magnitude lower time scale as the regular LTE broadcasting of system information, it still costs some broadcasting resources. Therefore, an alternative embodiment is that the network node 110 informs the master device 121 upon registration, that may be only once, about the current system state in terms of currently active master devices. The master device behavior is then similar as described above but using the one-time information about current masters rather than adjusting the Ptr value continuously.

The information about the set of available peer discovery resources may further comprise which Orthogonal Frequency Multiple Access, OFDM, frame to be used by the master device 121 as the specific peer discovery frame for sending the beacon signals. The peer discovery information may comprise the exact LTE frames, peer discovery frame, identified by specific sequence frame numbers, SFNs, known in the state of the art to identify LTE frames, and the set of peer discovery resources in the form of OFDM PHY resource blocks (PRB) within such frames that master devices such as the master device 121 may use for broadcasting beacon signatures. Peer discovery frames will be discussed more in detail below in relation to FIG. 6.

Action 403

In some embodiments the network node 110 determines a beacon transmission probability based on the number of available peer discovery resources in the peer discovery resource set and the number of registered master devices. The beacon transmission probability is the probability that the master device 121 transmits a beacon signal in a specific peer discovery frame. How this is determined will be further discussed below.

Action 404

The network node 110 may then send the beacon transmission probability to the respective one or more master devices 121.

Action 405

In some embodiments the network node 110 sends to the respective one or more master devices 121, information about the number of slave devices that have registered at the network device 110. The network node 110 further sends a threshold value that the respective one or more master device 121 shall use as a target rate for a discovering rate of the number of registered slave devices with respect to the number of registered slave devices. The threshold value T is the proportion of slave devices that discover any master device by detecting a beacon signal sent by the master device 121 compared to the total number of slaves that registered at the network node 110.

To perform the method actions for assisting in D2D discovery, the network node 110 comprises the following arrangement depicted in FIG. 3. As mentioned above, the network node 110 is comprised in a wireless network 100.

The network node 110 comprises a receiving circuit 510 configured to receive from respective one or more master devices 121 a registration that the master device 121 requests to be detected by a slave device 122.

The network node 110 further comprises a sending circuit 520 configured to send information over a coverage area of the network node 110. The information comprises the number of registered master devices 121 and a set of available peer discovery resources. The set of available peer discovery resources are to be used in a peer discovery frame by the respective one or more master devices 121 for sending beacon signals. The beacon signals are to be received by slave devices 122 to discover the master device 121 for D2D communication.

The sending circuit 520 further is configured to send the beacon transmission probability to the respective one or more master devices 121.

The sending circuit 520 may further be configured to send to the respective one or more master devices 121 information about the number of slave devices that have registered at the network device 110 and a threshold value that the respective one or more master device 121 shall use as a target rate for a discovering rate of the number of registered slave devices with respect to the number of registered slave devices.

The information about the set of available peer discovery resources further comprises which Orthogonal Frequency Multiple Access, OFDM, frame to be used by the master device 121 as the specific peer discovery frame for sending the beacon signals.

The network node 110 further comprises a processor 530 configured to determine a beacon transmission probability based on the number of available peer discovery resources in the peer discovery resource set and the number of registered master devices. The beacon transmission probability is the probability that the master device 121 transmits a beacon signal in a specific peer discovery frame.

Figure 5:
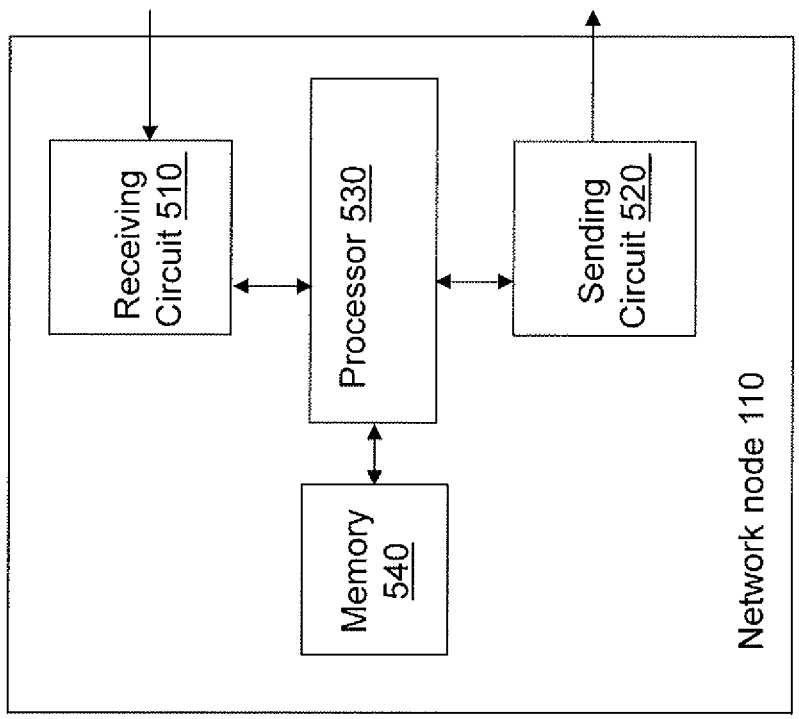
FIG. 5 is a schematic block diagram illustrating embodiments of a network node.

The embodiments herein for assisting in D2D discovery may be implemented through one or more processors, such as the processor 530 in the network node 110 depicted in FIG. 5, together with computer program code for performing the functions and actions of the embodiments herein. The program code mentioned above may also be provided as a computer program product, for instance in the form of a data carrier carrying computer program code for performing the embodiments herein when being loaded into the in the network node 110. One such carrier may be in the form of a CD ROM disc. It is however feasible with other data carriers such as a memory stick. The computer program code may furthermore be provided as pure program code on a server and downloaded to the network node 110.

The first network node 110 may further comprise a memory 540 comprising one or more memory units. The memory 540 is arranged to be used to store requests, and information mentioned above. The memory 540 is further arranged to store data, configurations, schedulings, and applications to perform the methods herein when being executed in the network node 110.

Those skilled in the art will also appreciate that the receiving circuit 510, the sending circuit 520, and the processor 530, described above may refer to a combination of analog and digital circuits, and/or one or more processors configured with software and/or firmware, e.g. stored in a memory such as the memory 540, that when executed by the one or more processors such as the processor 530 perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SaC).

The Text Below Refers to any Embodiment Above.

According to embodiments herein, master devices such as the master device 121 register at the cellular communications network 100, e.g. through base station 110 signaling, prior to using peer discovery resources. When slave devices such as the slave device 122 discover a master device such as the master device 121, the master device 121 may deregister and refrain from using peer discovery resources for the benefit of still non-discovered master devices such as e.g. registered active master devices.

Figure 6:
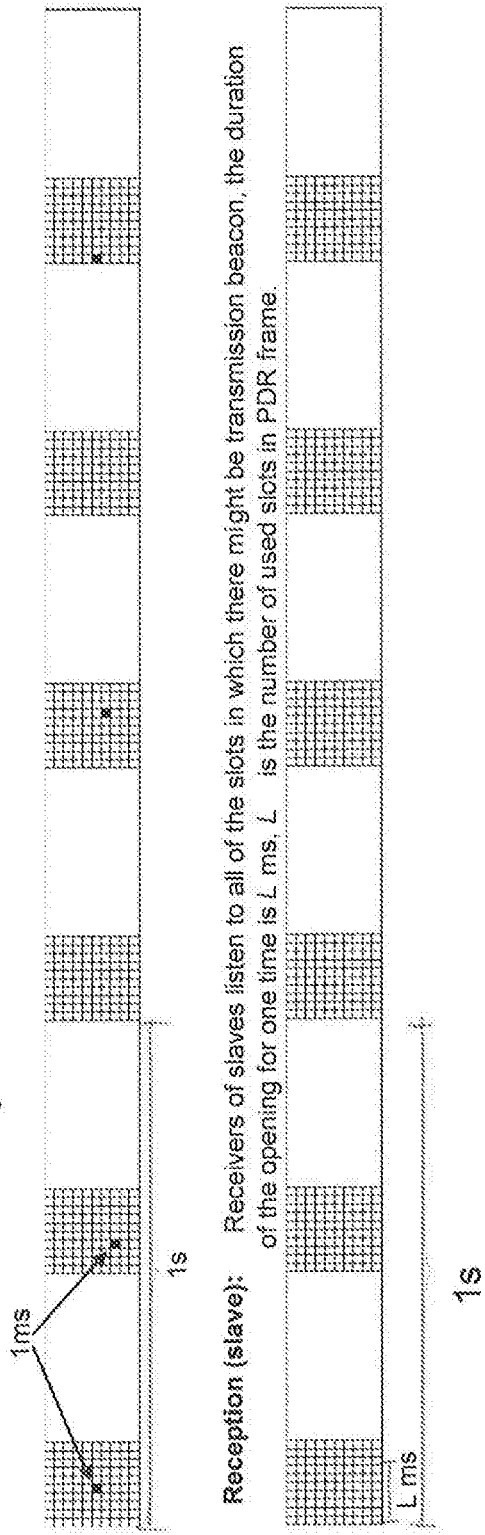
FIG. 6 is a schematic diagram illustrating embodiments herein.

FIG. 6 illustrates Peer Discover Frames (PDF) and Peer Discovery Resources (PDR). PDFs typically used by a low duty cycle out of all available OFDM, e.g. LTE frames. For example, there may only be one or two, as in FIG. 6, PDFs out of 100 LTE frames during a 1 sec time interval. Within each PDF, a subset of the available OFDM PHY resource blocks (PRBs) may be used for peer discovery, i.e. beacon signaling purposes, referred to as small black square. In this example it is assumed that the master device 121 would transmit a beacon signal for the duration of 1 ms.

Determining the Beacon Transmit Probability Ptr

Figure 7:
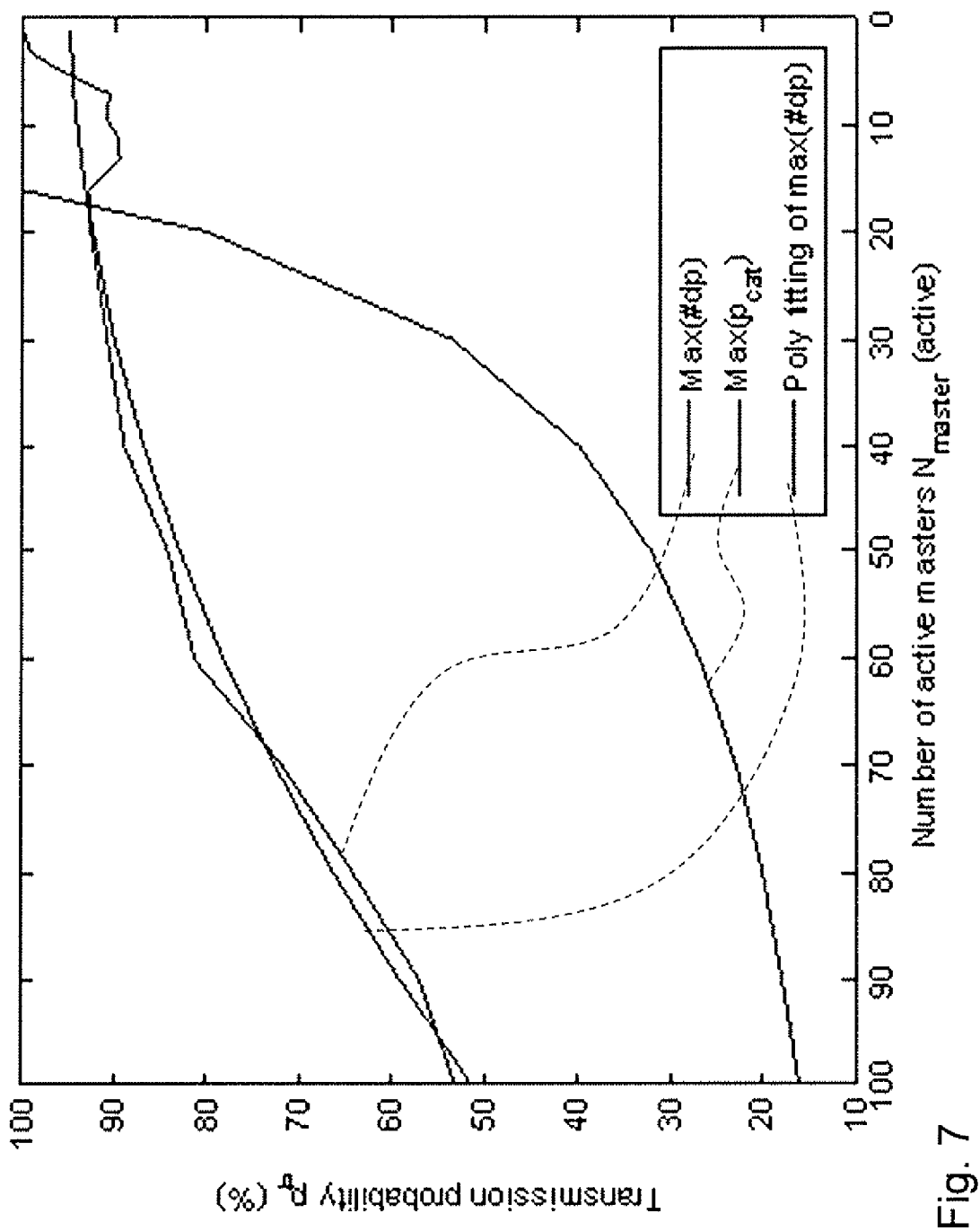
FIG. 7 is a schematic diagram illustrating embodiments herein.

FIG. 7 discloses a table of transmission probability values (Ptr) as a function of the currently active, registered, master devices in a coverage area of a cell or tracking area.

When the master device 121 registers at the network node 110 for beacon transmissions, it may also download a table maintained by the network node 110 that prescribes specific beacon transmit probabilities Ptr as a function of the currently registered, i.e. active master devices. This is an alternative, in which the computation of the transmission probabilities is done by the network node 110. This can be advantageous for low end user equipments, i.e. devices that need to minimize their complexity. Thus, this an alternative to that the master device 121 determines the beacon transmit probabilities (Ptr), i.e. the probability that the master device 121 transmits a beacon signal in a specific peer discovery frame in action 204. This table may be maintained by an Operations and Maintenance (O&M) subsystem. It may depend on the overall objective of the discovery process that may be set as:

Maximize the discovered master device-slave device pairs out of all possible master device-slave device pairs within a coverage area of a cell or a tracking area; Objective A, denoted as "Max #dp".

Maximize the probability of collision free beacon signal transmissions among active master devices. Objective B, denoted as "Max pcat", denoting collision avoiding transmissions.

As a heuristic method, the Ptr as a function of the number of active masters in the cell or tracking area may be set as follows, according to embodiments herein:

When the number of registered, i.e. active, master devices is less than 10% of the maximum allowed registered masters in the coverage area, the Ptr is set to 1.

When the number of registered master devices is 100% of the maximum allowed registered masters in the coverage area, the Ptr is set to a Pmin value. The Pmin value depends on Objective A or Objective B above. By way of an example, when the number of registered master devices exceeds the number of peer discovery resources within one frame, a reasonable assumption for practical systems, Pmin may be set to:
0.5 (in the case of Objective A)
0.05 (in the case of Objective B)

When the number of registered (active) Masters is less than 100% but greater than 10% of the maximum allowed registered masters in the coverage area, the Ptr may be set to linearly between Pmin and 1.

Setting the Ptr value using the above described heuristic is illustrated by FIG. 7.

An Alternative Method for Masters or the Network Node to Determine Ptr

Alternatively, a network operator may choose to only use the Max(Pcat) method and let the master device 121 determine the transmit probability using the following observation and method.

Recall that an important parameter is called probability of collision-avoided-transmission (Pcat), which expresses the probability for master devices such as the master device 121 to transmit beacon signals without collision with other beacon signals. It is also the probability for the slave device 122 to obtain a high MIR beacon from the transmitting master device 121. The probability of collision-avoided-transmission may be defined as $$p_{cat} = \frac{1}{N_{master}} \sum_i p\{A_i\}(1 - p\{B_i \mid A_i\}) \quad (6)$$

$$= p\{A_i\}(1 - p\{B_i \mid A_i\})$$

$$= p\{A_i\}\left(1 - \frac{p\{A_i\}}{N_{PDR}}\right)^{(N_{master}-1)} \forall i$$

The term of $p\{A_i\}(1-p\{B_i|A_i\})$ is the probability for master device-i transmitting without a collision, wherein p is a probability, wherein A is the event that the master device 121 transmits a beacon signal;

B is the event that any other, i.e. other than Device-I, transmits a beacon signal.

B|A is the event that any device other than Device-i transmits a beacon signal provided that Device-i transmits a beacon signal.

Since it is equal for all master devices, the probability of collision avoided transmission for all the masters is given by equation (6). If the number of PDR and number of master devices are fixed in a certain case, there is an option for the transmission probability which may maximize Pcat. So for a given number of registered master devices and number of PDRs, master devices such as the master device 121 may determine the transmission probability Ptr that maximizes (6).

Employing Stopping Criteria by the Master Device 121

In some embodiments, the master device 121 employs so called stopping criteria to stop sending beacon signals and thereby allow other master devices to be discovered. The master device may employ the following stopping criteria, the applicability of which depends on the availability of paging feedbacks by slave devices such as the slave device 122, either using a direct slave device to master device signaling, or using slave device to network node signaling and network node broadcasting:

A first stopping criterion may be that the master device 121 stops beacon signaling if the number of discovering slave devices reaches a certain threshold;

A second stopping criterion may be that the master device 121 stops advertising if the number of discovering slave devices remains unchanged throughout a given number of subsequent peer discovery frames.

As it is clear for the skilled person, the first stopping criterion and the second stopping criterion may be used in different "AND" or "AND/OR" combinations by the master device whenever paging feedback signaling is provided by slave devices such as the slave device 122. Paging feedback signaling means that the slave device 122 transmits a signal to the master device 121 whenever the said slave device 122 detects a beacon signal transmitted by the said master device 121. That is the slave device 122 uses paging feedback to notify a master device that the said master device 121 has been detected by the said slave device 122. The advantage of this is that the master device 121 can know which and how many slave devices have detected its beacon transmissions.

The network node 110 may refresh the master device and slave device database and update the set of available peer discovery resources.

As described above in action 203 and 401, the network node 110 may maintain a list of registered i.e. active master devices within the coverage area of a cell or tracking area. This list may then be used by the network node 110 to form information to be sent to the master device 121 in action 203 and 402. The information may comprise current number of registered master devices and description or identification of the set of available peer discovery resources in peer discovery frames.

Furthermore, and recalling action 209, and 405, the network node 110 may in some embodiments maintain and/or continuously broadcast the number of slave devices within the coverage or tracking area. This may be in the same list or a separate list as the active master devices.

Multiple networks nodes including the network node 110 may cooperate to help each other to maintain the current list of registered and active master and slave devices. In some embodiments, this list is updated when a master device stops sending beacon signals and/or due to mobility.

Since the network node 110 in some embodiments requires to keep the number of active master devices and slave devices, it is advantageous to continuously update these data. If the network node 110 knows how many registered master devices there are, the network node 110 may configure the necessary beacon signal resources such that the probability of beacon signal collision is kept under some predefined threshold. If the network node 110 knows the number of slave devices, the network node 110 may signal this number to the master devices such as the master device 121, and if the master devices such as the master device 121 know the total number of slave devices listening to beacons, the master devices may know when to stop transmitting beacons. For example, the master device 121 utilizing the paging feedback signals, may decide that when 80% of the total number of slave devices provided feedback, the master device stops sending beacons. To this end, according to embodiments herein, the master device 121 and the slave device 122 may follow the procedure below.

When the master device such as the master device 121 or slave device such as the slave device 122 moves out of the coverage area of the network node 110 into a coverage area of another network node, it re-registers at the other network node. The another network node has been determined by the master device and/or the slave device by using existing methods such as standardized idle mode mobility methods in UMTS or LTE systems. This may happen when moving into the coverage area of a new LTE network node, or moving into a new tracking area and sending a Tracking Area Update message using Non-Access Stratum (NAS) signaling. In this registration message, the master device 121 and/or the slave device 122 include the identification of the network node 110 at which they were registered to prior to moving into the new coverage area. Otherwise, this registration message is similar to that described in action 201 and 401.

The other network node may optionally send a "Master/Slave is Re-Registered" message to the network node 110. This message notifies the network node 110 that it should update its database of the currently active master devices and slave devices and update its continuous broadcasting message accordingly.

When the master device 121 stops broadcasting beacon signals according to any of the so called stopping criteria described above, it sends a "Beacon Broadcasting Terminated" message to the network node 110. This message allows the network node 110 to continuously keep track of the active masters.

Advantages

To gain an insight into the advantage of the embodiments herein, it has been studied the impact of the method disclosed by the embodiments herein on the discovery time, discovery rate and energy consumption and it has been compared the performance with that of no network assisted and network-device unicast based network assistance.

The main characteristics of the D2D discovery mechanisms applied in five scenarios are summarized in the Table shown in FIG. 8.

The five scenarios of different Network Assistance Levels (NAL5), NAL0, NAL1, NAL2, NAL3, and NAL4 considered in FIG. 8 are as follows:

NAL 0: No network assistance other than providing synchronization.

NAL 1. The network node 110 broadcasts the number of active and/or registered master devices including the master device 121. Slave devices do not provide feedback on captured beacon signals either to the network node 110 or to the master devices. Thus the master devices do not stop beaconing, i.e. no stopping criteria are applied.

NAL2. The network node 110 provides the number of active and/or registered master devices upon master device registration as described above. Master devices do not have up to date, continuously updated, information about the number of registered master devices in the coverage area. Slave devices provide feedback signaling to discovered master devices and/or to the network node 110.

NAL3. The network node 110 provides the number of active and/or registered master devices via a continuous or periodic broadcast signaling according to embodiments herein. Slave devices provide feedback signaling to discovered master devices and/or to the network node 110.

NAL4. The network node 110 uses network node-device signaling to reserve orthogonal resources for master devices. This Scenario is not scalable but provides optimal beacon signaling performance in the sense that beacon collisions are eliminated.

Some embodiments herein comprises:

A method whereby the current number of active masters and the available peer discovery resources are broadcasted in the coverage area.

A method whereby the number of Discovering Slaves is maintained at each Master node.

A method whereby each Master adjusts its beacon transmit probability based on the registered other Master nodes in the coverage area and available total peer discovery resources.

A method whereby a Master node employs stopping criteria to determine whether a beacon signal should be broadcasted in the coverage area of a cell or a tracking area.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method in a first user equipment (UE) for sending beacon signals, which beacon signals are to be received by a second UE to discover the first UE for Device to Device (D2D) communication, which first UE is comprised in a wireless network, the method comprising:
  receiving from a network node information about a set of available peer discovery resources to be used in a peer discovery frame by the first UE for sending beacon signals, which beacon signals are to be detected by the second UE,
  obtaining, from the network node, information about a number of registered first UEs within a cell or tracking area associated with the network node,
  obtaining a beacon transmission probability, which beacon transmission probability is the probability that the first UE transmits a beacon signal in a specific peer discovery frame, and wherein obtaining the beacon transmission probability comprises determining the beacon transmission probability based on a number of available peer discovery resources in the set of available peer discovery resources and a number of active first UEs,
  at each specific peer discovery frame determining according to the beacon transmission probability, whether or not a beacon signal shall be transmitted during that specific peer discovery frame, and
  when determining to transmit a beacon signal during that specific peer discovery frame, sending the beacon signal by choosing one of the peer discovery resources out of the received set of available peer discovery resources.

2. The method according to claim 1, wherein the beacon transmission probability is received from the network node in a transmission.

3. The method according to claim 1, wherein the information about the set of available peer discovery resources further comprises information about which Orthogonal Frequency Multiple Access (OFDM) frame to be used by the first UE as the peer discovery frame for sending the beacon signals.

4. The method according to claim 1, further comprising:
  registering to the network node by signaling that the first UE requests to be detected by a second UE.

5. The method according to claim 1, further comprising:
  obtaining from the network node, information about a number of second UEs that have registered at the network node and a threshold value T that the first UE shall use as a target rate for a discovering rate of the number of registered second UEs with respect to the number of registered second UEs.

6. The method according to claim 5, further comprising:
  stopping the beacon signal transmission when the threshold value T is reached.

7. The method according to claim 5, further comprising maintaining a list of second UEs that have discovered the first UE.

8. The method according to claim 7, further comprising:
  when the number of discovering second UEs does not change during a number of subsequent peer discovery frames, stopping the sending of the beacon signals.

9. A method in a network node for assisting in Device to Device (D2D) discovery, which network node is comprised in a wireless network, the method comprising:
  receiving from respective one or more first user equipments (UEs), a registration that the first UE requests to be detected by a second UE;
  sending information to the respective one or more first UEs, which information comprises a number of registered first UEs and a set of available peer discovery resources, which set of available peer discovery resources are to be used in a peer discovery frame by the respective one or more first UEs for sending beacon signals, which beacon signals are to be received by second UEs to discover the first UE for D2D communication, the method further comprising determining a beacon transmission probability based on a number of available peer discovery resources in the set of available peer discovery resources and the number of registered first UEs, and which beacon transmission probability is the probability that the first UE transmits a beacon signal in a specific peer discovery frame, sending the beacon transmission probability to the respective one or more first UEs.

10. The method according to claim 9, further comprising:
  sending to the respective one or more first UEs information about a number of second UEs that have registered at the network node and a threshold value that the respective one or more first UEs shall use as a target rate for a discovering rate of the number of registered second UEs with respect to the number of registered second UEs.

11. The method according to claim 9, wherein the information about the set of available peer discovery resources further comprises which Orthogonal Frequency Multiple Access (OFDM) frame to be used by the first UE as the specific peer discovery frame for sending the beacon signals.

12. A first user equipment (UE) for sending beacon signals, which beacon signals are to be received by a second UE to discover the first UE for Device to Device (D2D) communication, which first UE is comprised in a wireless network, the first UE comprising:
  a receiving circuit configured to receive from a network node information about a set of available peer discovery resources to be used in a peer discovery frame by the first UE for sending beacon signals, which beacon signals are to be detected by the second UE,
  an obtaining circuit configured to obtain a beacon transmission probability, which beacon transmission probability is the probability that the first UE transmits a beacon signal in a specific peer discovery frame,
  a sending circuit configured to at each specific peer discovery frame determine according to the beacon transmission probability, whether or not a beacon signal shall be transmitted during that specific peer discovery frame, and
  when determining to transmit a beacon signal during that specific peer discovery frame, send the beacon signal by choosing one of the peer discovery resources out of the received set of available peer discovery resources, characterized in that the obtaining circuit further is configured to obtain from the network node, information about a number of registered first UEs within a cell or tracking area associated with the network node, and wherein the obtaining circuit further is configured to obtain the beacon transmission probability by determining the beacon transmission probability based on a number of available peer discovery resources in the set of available peer discovery resources and a number of active first UEs.

13. The first UE according to claim 12, wherein the beacon transmission probability is received from the network node in a transmission.

14. The first UE according to claim 12, wherein the information about the set of available peer discovery resources further comprises which Orthogonal Frequency Multiple Access (OFDM) frame to be used by the first UE as the specific peer discovery frame for sending the beacon signals.

15. The first UE according to claim 12, wherein the sending circuit further is configured to register to the network node by signaling that the first UE requests to be detected by a second UE.

16. The first UE according to claim 12, wherein the obtaining circuit further is configured to obtain from the network node, information about a number of second UE that have registered at the network node and a threshold value T that the first UE shall use as a target rate for a discovering rate of the number of registered second UEs with respect to the number of registered second UEs.

17. The first UE according to claim 16, further comprising a stopping circuit configured to stop the beacon signal transmission when the threshold value T is reached.

18. The first UE according to claim 16, further comprising a maintaining circuit configured to maintain a list of second UEs that have discovered the first UE.

19. The first UE according to claim 18, wherein the stopping circuit further is configured to stop the sending of the beacon signals when the number of discovering second UEs does not change during a number of subsequent peer discovery frames.

20. A network node for assisting in Device to Device (D2D) discovery, which network node is comprised in a wireless network, the network node comprises:
   a receiving circuit configured to receive from respective one or more first user equipments (UEs), a registration that the first UE requests to be detected by a second UE;
   a sending circuit configured to send information to the respective one or more first UEs, which information comprises a number of registered second UEs and a set of available peer discovery resources, which set of available peer discovery resources are to be used in a peer discovery frame by the respective one or more first UEs for sending beacon signals, which beacon signals are to be received by second UEs to discover the first UE for D2D communication, characterized in that the network node further comprises a processor configured to determine a beacon transmission probability based on a number of available peer discovery resources in the set of available peer discovery resources and the number of registered first UEs, which beacon transmission probability is the probability that the first UE transmits a beacon signal in a specific peer discovery frame, and wherein the sending circuit further is configured to send the beacon transmission probability to the respective one or more first UEs.

21. The network node according to claim 20, wherein the sending circuit further is configured to send to the respective one or more first UEs information about a number of second UEs that have registered at the network node and a threshold value that the respective one or more first UEs shall use as a target rate for a discovering rate of the number of registered second UEs with respect to the number of registered second UEs.

22. The network node according to claim 20, wherein the information about the set of available peer discovery resources further comprises which Orthogonal Frequency Multiple Access (OFDM) frame to be used by the first UE as the specific peer discovery frame for sending the beacon signals.

23. The method according to claim 1, wherein the first UE is a master device and the second UE is a slave device.

24. The method according to claim 9, wherein the first UE is a master device and the second UE is a slave device.

25. The first UE according to claim 12, wherein the first UE is a master device and the second UE is a slave device.

26. The network node according to claim 20 wherein the first UE is a master device and the second UE is a slave device.

* * * * *